US011246060B2

(12) United States Patent
Kucera et al.

(10) Patent No.: US 11,246,060 B2
(45) Date of Patent: Feb. 8, 2022

(54) NETWORK NODE COMMUNICATION

(71) Applicant: Nokia Technologies Oy, Espoo (FI)

(72) Inventors: Stepan Kucera, Dublin (IE); Kariem Fahmi, Dublin (IE)

(73) Assignee: Nokia Technologies OY, Espoo (FI)

( * ) Notice: Subject to any disclaimer, the term of this patent is extended or adjusted under 35 U.S.C. 154(b) by 79 days.

(21) Appl. No.: 16/481,000

(22) PCT Filed: Jan. 25, 2018

(86) PCT No.: PCT/EP2018/051886
§ 371 (c)(1),
(2) Date: Jul. 25, 2019

(87) PCT Pub. No.: WO2018/138222
PCT Pub. Date: Aug. 2, 2018

(65) Prior Publication Data
US 2019/0394679 A1    Dec. 26, 2019

(30) Foreign Application Priority Data
Jan. 27, 2017   (EP) .................................... 17153493

(51) Int. Cl.
H04W 28/08    (2009.01)
H04W 80/06    (2009.01)
(Continued)

(52) U.S. Cl.
CPC ....... *H04W 28/08* (2013.01); *H04W 28/0819* (2020.05); *H04W 76/16* (2018.02); *H04W 80/06* (2013.01); *H04W 88/182* (2013.01)

(58) Field of Classification Search
CPC ..... H04W 84/12; H04W 88/06; H04W 76/12; H04W 76/15–16; H04W 28/08
See application file for complete search history.

(56) References Cited

U.S. PATENT DOCUMENTS

2012/0188949 A1    7/2012  Salkintzis et al.
2013/0077501 A1    3/2013  Krishnaswamy et al.
(Continued)

OTHER PUBLICATIONS

International Search Report for PCT/EP2018/051886 dated Jun. 6, 2018.
European Search Report for EP 17153493 dated Jul. 26, 2017.

*Primary Examiner* — Marcus Smith
(74) *Attorney, Agent, or Firm* — Fay Sharpe LLP

(57) ABSTRACT

Network nodes, methods and computer program products are disclosed. The network node is for a wireless telecommunications network and comprises: processing logic operable to execute an application which establishes a data session for transmission of data packets between the network node and another network node; a first radio interface operable to support transmission of data packets with the another network node using a first radio access technology in accordance with any of a plurality of different data transport protocols; a second radio interface operable to support transmission of data packets with the another network node using a second radio access technology in accordance with any of a plurality of different data transport protocols; and a controller operable to select which radio interface and data transport protocol to use for transmission of the data packets of the data session between the network node and the another network node. In this way, the network node is able to transmit data packets between the network node and the other network node for the data session using any of the different radio interfaces and any of the different data transport protocols. This provides for the flexibility to select the radio interfaces and data transport protocols appropriate to the network conditions in order to improve the communication performance and alleviate any performance impacts caused by the network.

14 Claims, 5 Drawing Sheets

(51) Int. Cl.
*H04W 88/18* (2009.01)
*H04W 76/16* (2018.01)

(56) References Cited

U.S. PATENT DOCUMENTS

| | | | |
|---|---|---|---|
| 2015/0181459 A1* | 6/2015 | Zhu | H04L 65/80 370/236 |
| 2015/0245401 A1* | 8/2015 | Salkintzis | H04W 76/16 370/329 |
| 2016/0165621 A1 | 6/2016 | Kaur et al. | |
| 2017/0026487 A1* | 1/2017 | Toth | H04L 12/6418 |
| 2017/0339729 A1* | 11/2017 | Szabo | H04W 28/0268 |
| 2018/0041421 A1* | 2/2018 | Lapidous | H04L 69/14 |

\* cited by examiner

Illustration of asymmetric routing and middle-box interference (i) Asymmetric routing Dynamically reconfigurable routing of uplink and downlink subflows based on switching of TCP-over-UDP and TCP protocols (ii) Symmetric routing Dynamically reconfigurable routing of uplink and downlink subflows based on switching of TCP-over-UDP and TCP protocols The multi-connectivity is deployed in unmodified legacy terminals by downloading a specialized application whose installation activates and configures a virtual private network (VPN), implementing the multi-path communications protocol Networking stack for asymmetric routing in multi-connectivity scenarios with indicated IP and port identifiers

NETWORK NODE COMMUNICATION

FIELD OF THE INVENTION

The present invention relates to network nodes, methods and computer program products.

BACKGROUND

User equipment or mobile devices such as smart phones and tablets have ever increasing data requirements. They also typically support multi-technology multi-band networking and are commonly equipped with multiple Long-Term Evolution (LTE), High Speed Packet Access (HSPA), WiFi transceivers operational in multiple licensed and unlicensed frequency bands. Additionally, new 5G interfaces as well as the allocation of new (shared) frequency bands can be expected in the near future.

The capability of communicating over multiple radio interfaces can be exploited by enabling multi-path data delivery over parallel wireless links (paths). This use of multiple resources to deliver data could provide a significant increase of throughput and link reliability as well as reduced latency compared to the conventional single-path paradigm.

However, operating over multiple radio interfaces can have unexpected consequences. Accordingly, it is desired to provide improved techniques for network node communication.

SUMMARY

According to a first aspect, there is provided a network node for a wireless telecommunications network, comprising: processing logic operable to execute an application which establishes a data session for transmission of data packets between the network node and another network node; a first radio interface operable to support transmission of data packets with the another network node using a first radio access technology in accordance with any of a plurality of different data transport protocols; a second radio interface operable to support transmission of data packets with the another network node using a second radio access technology in accordance with any of a plurality of different data transport protocols; and a controller operable to select which radio interface and data transport protocol to use for transmission of the data packets of the data session between the network node and the another network node. The first aspect recognises that irrespective of what layer is chosen for implementing multi-path integration (application, transport, link, or Packet Data Convergence Protocol (PDCP) layer), the quality of integrated multi-path wireless services is generally uneven. For example, WiFi networks are typically characterized by high peak rates, but lower efficiency for small packets, and by limited coverage due to low transmit power limits. More critically, however, their effective throughput degrades as function of the overall load due to frequent packet collisions under the WiFi contention-based medium access. Collisions between uplink Transmission Control Protocol (TCP) acknowledgements (ACK) and downlink TCP data packets result in a low overall usage of available capacity, even below 25%. On the other hand, cellular HSPA/LTE networks are characterized by ubiquitous coverage, high spectral efficiency, and scheduled (collision-free) medium access, although they use comparatively smaller bandwidths than WiFi, and typically experience longer end-to-end packet delivery latency. The 3GPP is currently studying in the LTE-WiFi integration (LWIP) work item of LTE Release 13 how IP-layer forwarding can used to offload problematic WiFi uplink subflows to LTE (e.g., by modifying the IP routing metric for uplink flows). Importantly, the targeted deployment scenario assumes integration of LTE eNodeBs and WiFi access points within a local area network (ideally, a collocated LTE-WiFi deployment). Yet commercial development and roll-out of R13-compliant and LWIP-capable phones and tablets will not start before 2017. The owners of Android-based equipment could theoretically take advantage of future LWIP deployments by using nowadays equipment but only if the operating system was modified to comply with the integration technology requirements. Yet any such change in not trivial and the phone unlocking prerequisite typically voids the maker warranty. In general, the LWIP concept to asymmetric routing of wireless data over physically different downlink and uplink paths cannot be readily extended to dynamic scenarios with wide-area IP integration, neither on a session level nor on a per-packet basis. The reason to this is the presence of so-called middle-boxes such as network address/port translators (NAT), firewalls and performance enhancing proxies in the Internet and network cores. Middle-boxes are non-standardized devices that typically monitor the consistency and integrity of bi-directional data flows such as TCP (around 80% of Internet traffic). So for example, the sequence numbers of TCP downlink (DL) data must match the sequence numbers carried by TCP uplink (UL) ACKs, and only small offsets are tolerable. Yet in case of asymmetric routing of TCP data for capacity boost by collision avoidance, the middle-boxes will observe only one half of the original data flow—either the TCP downlink data or TCP uplink ACKs. This inconsistency will typically result in subflow blockage, i.e. an interruption of the entire TCP connection as shown in FIG. 1. In fact, an asymmetric TCP connection would most likely not even be opened under NAT interference as the observation of TCP handshake between the user equipment and the server is used condition for establishing middle-box binding rules. In this context, it is worth mentioning that encapsulating asymmetric TCP flows into symmetric TCP flows to avoid middle-box interference is generally not an option either. Middle-boxes would typically discard duplicate ACKs of symmetric connections that piggy-bag the ACKs of asymmetric TCP connections.

Accordingly, a wireless telecommunications network node may be provided. The node may comprise processing logic which may execute an application. Executing the application may cause a data session to be established. That data session may provide for transmission of data packets between the network node and another network node. The network node may have a first radio interface. The first radio interface may support or enable transmission of data packets between the network node and the another network node. The transmission of the data packets may be using a first radio access technology. The data packets may be encoded in accordance with any of a plurality of different data transport protocols for transmission over the first radio interface. The network node may have a second radio interface. The second radio interface may differ to the first radio interface. The second radio interface may support or enable transmission of data packets between the network node and the another network node. The transmission of the data packets may be using a second radio access technology. The data packets may be encoded in accordance with any of a plurality of different data transport protocols for transmission over the first radio interface. The network node may also comprise a controller which selects the radio interface as well as the data transport protocol to be used when transmitting the data packets of the data session between the network node and the another network node. In this way, the network node is able to transmit data packets between the network node and the other network node for the data session using any of the different radio interfaces and any of the different data transport protocols. This provides for the flexibility to select the radio interfaces and data transport protocols appropriate to the network conditions in order to improve the communication performance and alleviate any performance impacts caused by the network.

In one embodiment, the controller is operable to establish sockets for each radio interface and data transport protocol for transmission between the network node and the another network node. Accordingly, the controller may pre-establish sockets to support communication using the different radio interfaces and data transport protocols so that these may be utilised when required, without introducing a set-up delay.

In one embodiment, the controller is operable to select which of the first radio interface and the second radio interface and which of the plurality of different data transport protocols to use for transmission of the data packets. Accordingly, the controller may select which radio interfaces and which data transport protocols should be used for subsequent transmission of data packets. In embodiments, that combination of interface and protocol may continue to be used until it is changed.

In one embodiment, the data packets comprise uplink data packets and downlink data packets and the controller is operable to select which radio interface and data transport protocol to use for transmission of the uplink data packets and the downlink data packets. Accordingly, the radio interfaces and data transport protocols may be selected separately for uplink and for downlink traffic. This enables uplink and downlink traffic to be carried over separate interfaces. In embodiments, offloading the uplink traffic may assist in the throughput of downlink traffic over a radio interface.

In one embodiment, the controller is operable to select one of the first radio interface and the second radio interface for transmission of the uplink data packets and another of the first radio interface and the second radio interface for transmission of the downlink data packets. Accordingly, one radio interface may be used for uplink traffic and another radio interface may be used for downlink traffic. In embodiments, offloading the uplink traffic may assist in the throughput of downlink traffic over a radio interface.

In one embodiment, the controller is operable to select one of the plurality of different data transport protocols for transmission of the uplink data packets and another of the plurality of different data transport protocols for transmission of the downlink data packets. Accordingly, the uplink traffic and the downlink traffic may be encoded with different data transport protocols. This may assist in preventing middleware boxes from blocking unexpected traffic.

In one embodiment, the controller is operable to select which radio interface and data transport protocol to use for subsequent transmission of the data packets. In embodiments, that combination of interface and protocol may continue to be used until it is changed.

In one embodiment, the controller is operable to select which radio interface and data transport protocol to use for each data packet. Accordingly, the radio interface and data transport protocol may be selected on a per-packet or per-packet group basis.

In one embodiment, the data packets of the data session each share a port indicator. Accordingly, irrespective of which data transport protocol and which interface is used, data packets from the same data session may each share or be identified by the same (common) port indicator.

In one embodiment, each data session is associated with a different port indicator. Accordingly, data packets from different data sessions may have or be identified by different port indicators.

In one embodiment, the data packets of the data session have a source IP address associated with that radio interface selected to be used for transmission.

In one embodiment, each radio interfaces is associated with a different source IP address.

In one embodiment, each data packet is encoded with an indication of its data transport protocol.

In one embodiment, the downlink data packets comprise a payload.

In one embodiment, the uplink data packets comprise acknowledgements.

In one embodiment, the controller is operable to select a default radio interface and data transport protocol to use. Accordingly, the controller may be preconfigured to select a preferred radio interface and data transport protocol to use initially for traffic on uplink and/or downlink.

In one embodiment, the controller is operable to change which radio interface and data transport protocol to use based on conditions affecting data packet transmissions between the network node and the another network node. Accordingly, when network conditions affect the transmission using the default selections, the radio interface and data transport protocol used may be changed for traffic on uplink and/or downlink.

In one embodiment, the controller is operable to change which radio interface and data transport protocol to use in response to one of modified and undelivered data packet transmissions between the network node and the another network node. Accordingly, should data packets fail to be delivered or are delivered in a modified form, then the radio interface and/or transport protocol may be changed.

In one embodiment, the controller is operable to select which radio interface and data transport protocol to use for transmission of control information associated with the data session between the network node and the another network node. Accordingly, control information associated with the data session may also be transmitted using a selected radio interface and data transport protocol.

In one embodiment, the control information comprises at least one of congestion information, meta-information, forward error correction information and configuration information for the controller.

In one embodiment, the controller is operable to provide an indication of which radio interface and data transport protocol is selected to the another network node. Accordingly, the network nodes may exchange information which identifies which radio interfaces and which data transport protocols are being used for the data session.

In one embodiment, at least one of the first radio interface and the second radio interface comprises 3GPP and IEEE wireless communication standard interfaces.

In one embodiment, the data transport protocols comprise TCP, UDP and UDP-encapsulated TCP.

In one embodiment, the controller is operable to select a 3GPP wireless communication standard interface as a default radio interface and TCP as a default data transport protocol for uplink and downlink. Accordingly, the controller may initially select a 3GPP radio interface with TCP encoded data for the data session.

In one embodiment, the controller is operable change radio interface and data transport protocol to an IEEE wireless communication standard interface and UDP-encapsulated TCP for downlink in response to network conditions. Accordingly, should network conditions permit, the controller may change the radio interface and data transport protocol away from 3GPP for the downlink traffic, in order to provide for asymmetric routing.

In one embodiment, the network node comprises one of user equipment and a proxy.

According to a second aspect, there is provided a network node method, the network node having a first radio interface operable to support transmission of data packets with another network node using a first radio access technology in accordance with any of a plurality of different data transport protocols and a second radio interface operable to support transmission of data packets with the another network node using a second radio access technology in accordance with any of a plurality of different data transport protocols, the method comprising: executing an application which establishes a data session for transmission of data packets between the network node and another network node; and selecting which radio interface and data transport protocol to use for transmission of the data packets of the data session between the network node and the another network node.

In one embodiment, the method comprises establishing sockets for each radio interface and data transport protocol for transmission between the network node and the another network node.

In one embodiment, the method comprises selecting which of the first radio interface and the second radio interface and which of the plurality of different data transport protocols to use for transmission of the data packets.

In one embodiment, the data packets comprise uplink data packets and downlink data packets and the method comprises selecting which radio interface and data transport protocol to use for transmission of the uplink data packets and the downlink data packets.

In one embodiment, the method comprises selecting one of the first radio interface and the second radio interface for transmission of the uplink data packets and another of the first radio interface and the second radio interface for transmission of the downlink data packets.

In one embodiment, the method comprises selecting one of the plurality of different data transport protocols for transmission of the uplink data packets and another of plurality of different data transport protocols for transmission of the downlink data packets.

In one embodiment, the method comprises selecting which radio interface and data transport protocol to use for subsequent transmission of the data packets.

In one embodiment, the method comprises selecting which radio interface and data transport protocol to use for each data packet.

In one embodiment, the method comprises allocating a common port indicator to the data packets of the data session.

In one embodiment, the method comprises allocating different common port indicators to data packets of different data sessions In one embodiment, the method comprises allocating a common source IP address to the data packets of the data session transmitted by a radio interface, the common source IP address being associated with that radio interface.

In one embodiment, each radio interfaces is associated with a different source IP address.

In one embodiment, the method comprises encoding each data packet with an indication of its data transport protocol.

In one embodiment, the downlink data packets comprise a payload.

In one embodiment, the uplink data packets comprise acknowledgements.

In one embodiment, the method comprises selecting a default radio interface and data transport protocol to use.

In one embodiment, the method comprises comprising changing which radio interface and data transport protocol to use based on conditions affecting data packet transmissions between the network node and the another network node.

In one embodiment, the method comprises changing which radio interface and data transport protocol to use in response to one of modified and undelivered data packet transmissions between the network node and the another network node.

In one embodiment, the method comprises selecting which radio interface and data transport protocol to use for transmission of control information associated with the data session between the network node and the another network node.

In one embodiment, the control information comprises at least one of congestion information, meta-information, forward error correction information and configuration information for the controller.

In one embodiment, the method comprises providing an indication of which radio interface and data transport protocol is selected to the another network node.

In one embodiment, at least one of the first radio interface and the second radio interface comprises 3GPP and IEEE wireless communication standard interfaces.

In one embodiment, the data transport protocols comprise TCP, UDP and UDP-encapsulated TCP.

In one embodiment, the method comprises selecting a 3GPP wireless communication standard interface as a default radio interface and TCP as a default data transport protocol for uplink and downlink.

In one embodiment, the method comprises changing radio interface and data transport protocol to an IEEE wireless communication standard interface and UDP-encapsulated TCP for downlink in response to network conditions.

In one embodiment, the network node comprises one of user equipment and a proxy.

According to a third aspect, there is provided a computer program product operable, when executed on a computer, to perform the method of the second aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figure 1:
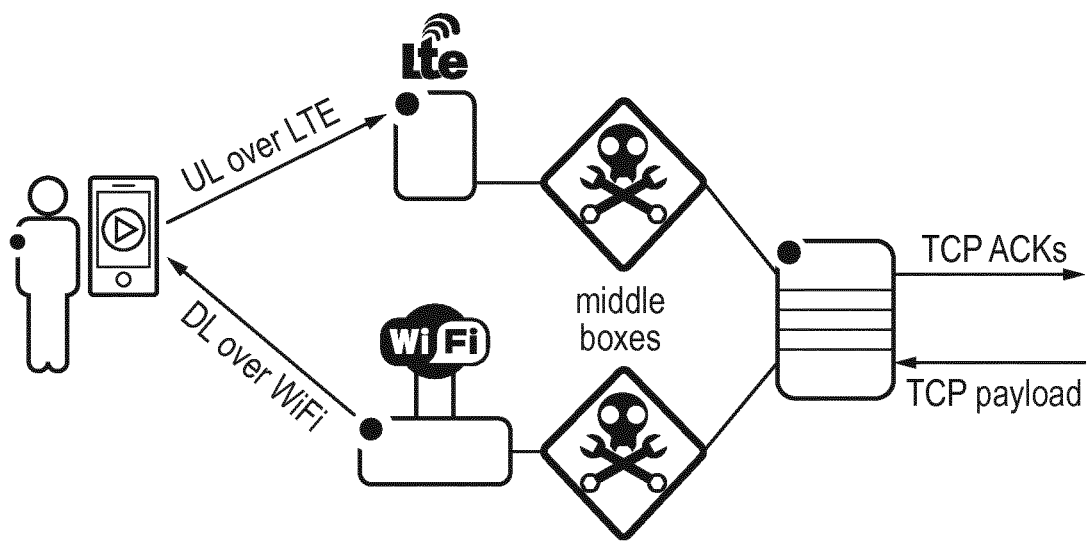
FIG. 1 illustrates asymmetric routing and middle box interference.

Before discussing the embodiments in any more detail, first an overview will be provided. Embodiments provide an arrangement which provides flexibility to enable network nodes such as user equipment and other network nodes such as proxy nodes to select different combinations of radio interfaces and data encoding protocols to be used for transmission of uplink and downlink traffic between those network nodes in order to provide for, for example, asymmetric routing, while ameliorating the impact caused by middle-box operation on the traffic in the network. In particular, a network node controller within the network nodes will select the most appropriate radio interface to support uplink and downlink traffic for particular data sessions, and these may be different radio interfaces when asymmetric routing is required. Should the asymmetric routing cause difficulties in the network such as the intervention of middle-boxes, then a data transport protocol may be selected to alleviate these difficulties and prevent the intervention of the middle-boxes. For example, a network node may be initially configured to perform uplink and downlink with another network node using data packets encoded Transmission Control Protocol (TCP) over a 3GPP radio interface. However, the controller may wish to switch to asymmetric routing to utilise for example a Wi-Fi radio interface for downlink traffic. The controller may then switch the downlink traffic to the Wi-Fi radio interface and retain the uplink traffic on the 3GPP radio interface. In order to prevent the intervention of middleware boxes which may spot out-of-range TCP sequence numbers, the uplink and downlink data packets may be encoded with for example a TCP over User Datagram Protocol (UDP). The middle boxes treat those data packets as UDP data packets, which prevents middle-box intervention. It will be appreciated that the controller may select any combination of radio interfaces and data transport protocols to suit network conditions and transmission objectives. Also, it will be appreciated that the data session sub-flows may also be divided into further sub-flows which may be transmitted with different radio interfaces and data transport protocols. For example, uplink or downlink traffic may be divided into different sub-flows and those sub-flows transmitted using different or the same radio interface, together with different or the same data transport protocol. To reduce latency during operations, sockets are typically pre-established at each network node for each data session to support transmission using each combination of radio interface and data transport protocol. Although the following embodiments describe two different radio interfaces, it will be appreciated that network nodes may be provided with more than two different radio interfaces. Also, although the following embodiments describe the use of two different data transport protocols, it will be appreciated that more than two different data transport protocols may be provided.

As mentioned above, embodiments typically use UDP encapsulation of TCP flows to enable reliable asymmetric delivery of wireless data in a general multi-connectivity environment. Unlike in the case of state-full TCP, the state-less nature of UDP ensures a seamless traversal through middle-boxes even in scenarios characterized by routing asymmetry.

In order to be able to dynamically reconfigure symmetric/asymmetric routing of active data transfers—a feature highly desired in a mobile environment with variable link quality in terms of achievable data rates and experienced congestion—embodiments use for each independent data flow two different protocols, sharing the same IP and port identifiers and ideally managed by the same socket of the operating system kernel, that will be dedicated to either symmetric or asymmetric data delivery.

More specifically, TCP-over-UDP (ToU) and TCP-based protocols are used for asymmetric and symmetric data delivery, respectively. The protocol (headers) used for active data delivery is selected (even on a per-packet basis) in accordance with the currently selected routing type as configured by a connection manager.

The connection manager assists in establishing seamless Network address translation (NAT)-traversal of UDP-encapsulated protocols (e.g., conforming to IETF standards) as well as in managing forward-error correction performance of protocols with such cap ability.

Network Nodes

Figure 2:
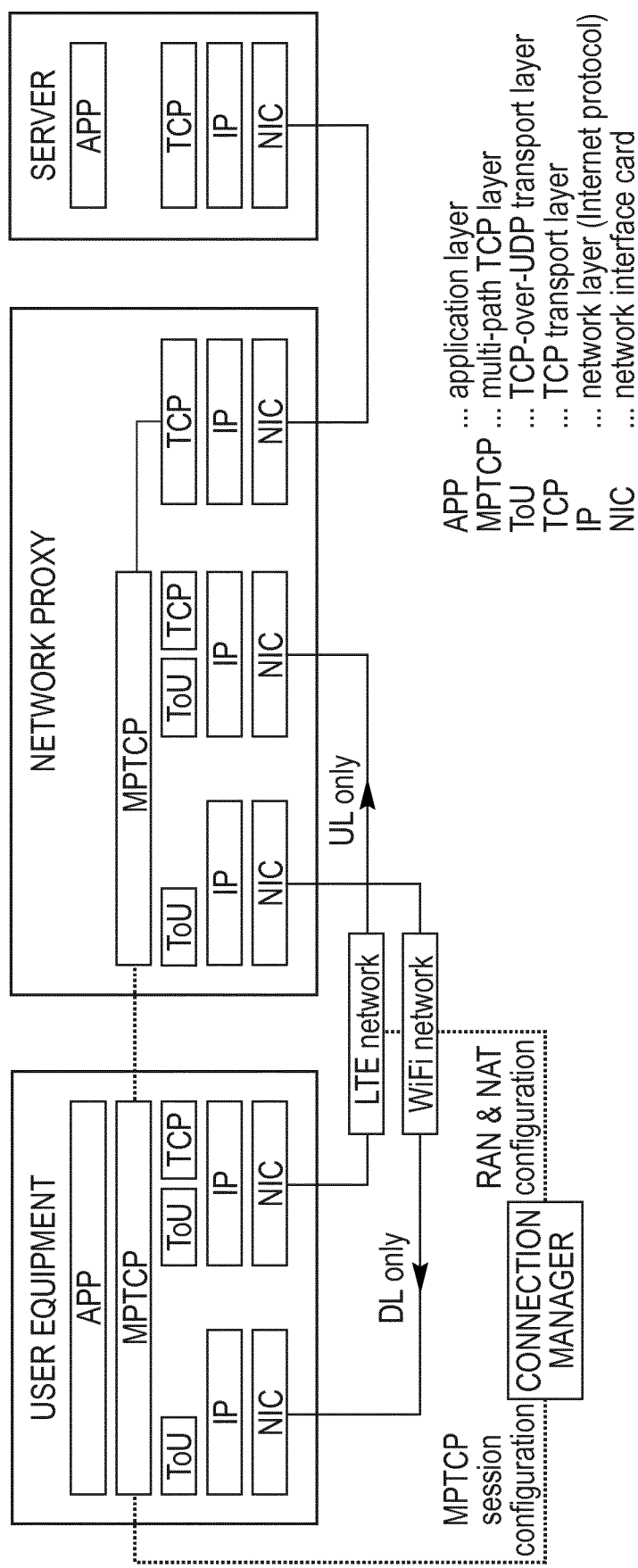
FIG. 2 illustrates symmetric and asymmetric routing between network nodes according to one embodiment.
Figure 2:
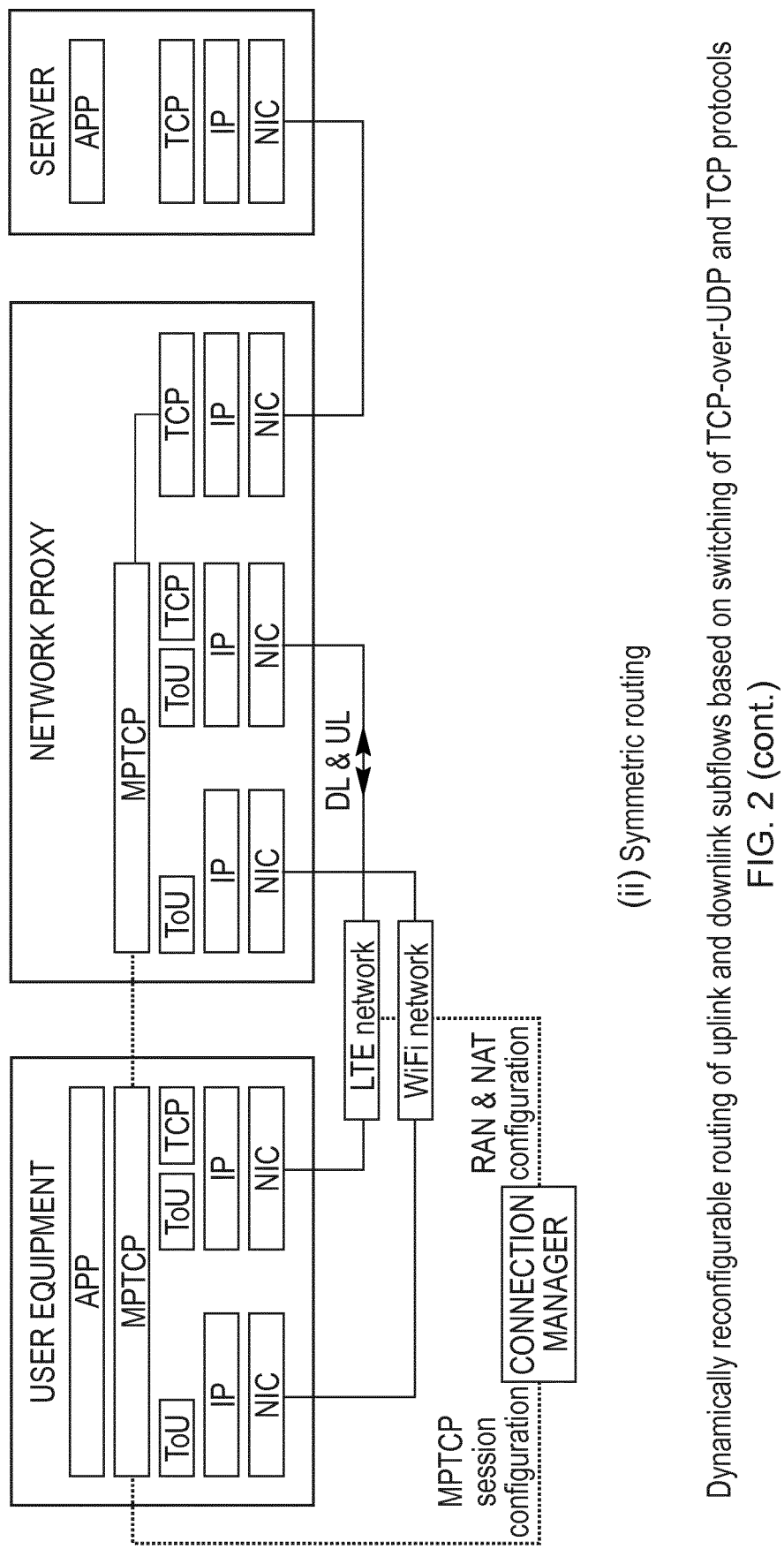

FIG. 2 illustrates network nodes according to one embodiment. In this figure, MPTCP refers to an arbitrary multi-path (MP) transport control protocol that integrates multiple subflows, delivered by using a transport protocol which supports MPTCP signalling—in this example, TCP and TCP-over-UDP as standardized by the Internet Engineering Task Force (IETF).

Network Data-Plane Architecture

In one embodiment, multi-connectivity is enabled in an unmodified legacy user equipment phone or tablet by downloading and installing a specialized application based on the standard user-space framework for virtual private networks (VPN). The application is created by a network operator, and publically posted on app store.

Such a VPN-based architecture allows implementing both standardized and non-standardized protocols for multi-path communications.

Figure 3:
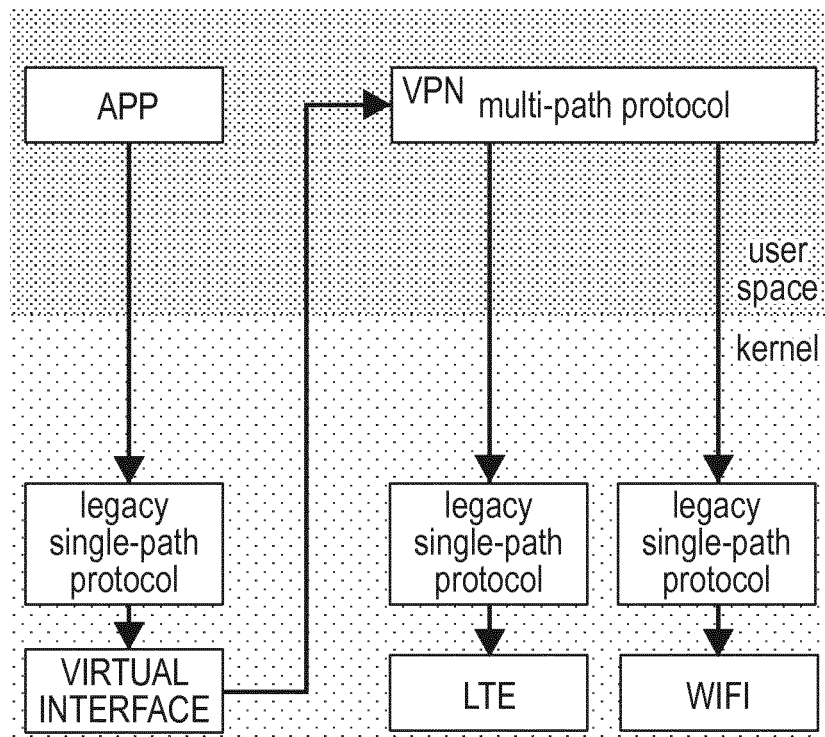
FIG. 3 illustrates a VPN service according to one embodiment.

As illustrated in FIG. 3, on the uplink, user-side generated application data are routed to/from the VPN service via a virtual interface, configured in the user equipment (UE) during the installation of the VPN application. The UE VPN service splits the ingress single-path data flow of the application into multiple egress subflows which are then forwarded over multiple physical interfaces (e.g., LTE and WiFi) to an aggregation proxy, deployed in an edge cloud. The proxy reassembles the multiple subflows into the original data flow, and forwards the aggregated stream to the remote content server.

On the downlink, the whole process is reversed. It is the aggregation proxy that splits the downlink data coming from the remote server, and forwards the multiple subflows to the UE VPN service for aggregation.

Network Control-Plane Architecture

In one embodiment, the UE and the edge cloud contain a client-side connection manager (CCM) and a network-side connection manager (NCM), respectively. These two entities negotiate network paths, flow routing, aggregation protocols, and all the related parameters. In one embodiment, the UE CCM can reside within the VPN service while the NCM can be part of the network-side aggregation proxy.

The NCM notifies the CCM on current routing configuration and the involved radio access technologies (RAT).

Example 1

This example is based on the usage of transport-layer protocols standardized by the IETF.

Figure 4:
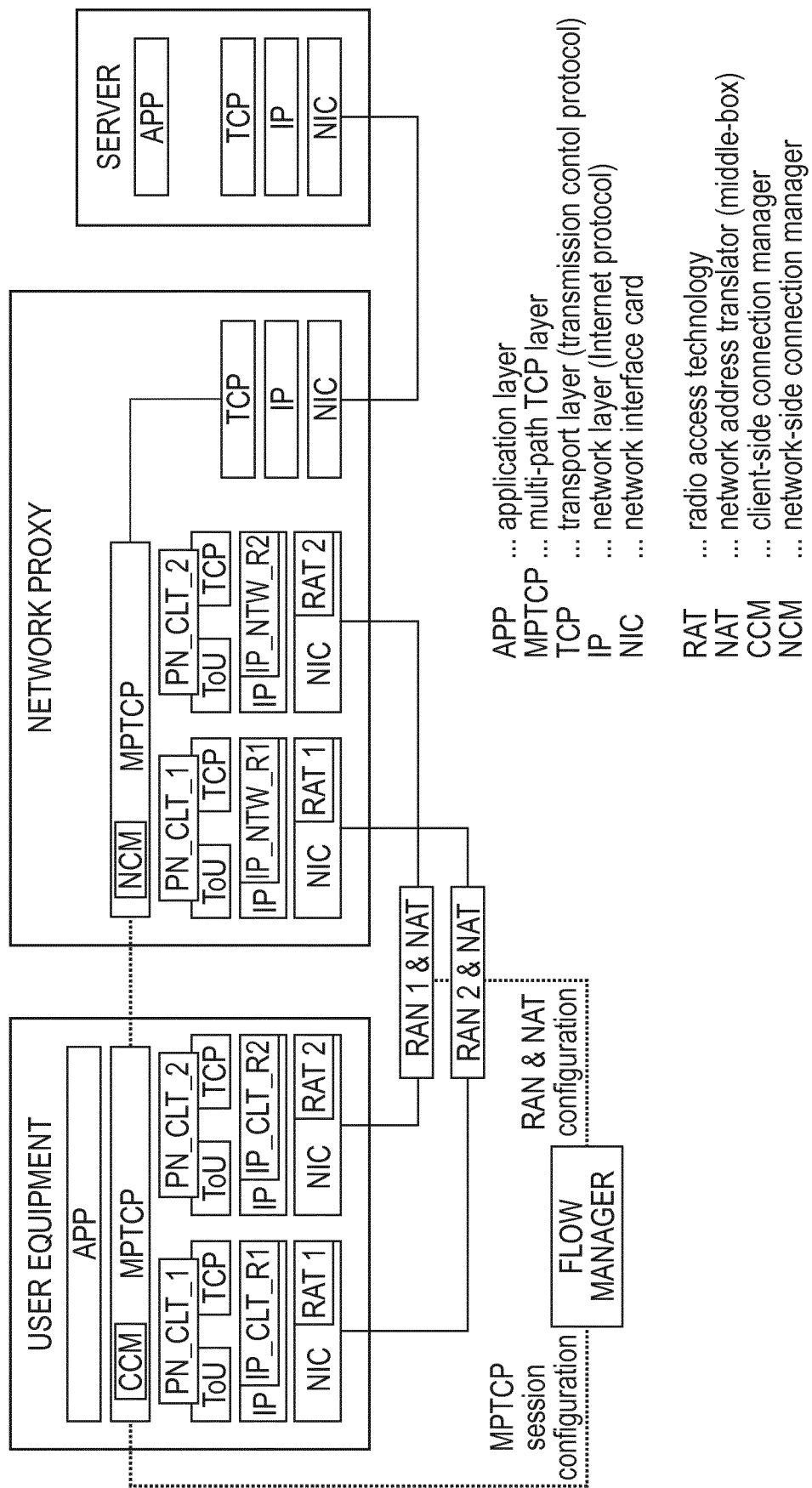
FIG. 4 illustrates a network stack between network nodes according to one embodiment.

As shown in FIG. 4, the example assumes two independent radio access technologies RAT 1 and RAT 2 whose packet cores comprise a network address translator (NAT) for translating local and public addresses (ports). The network interface cards (NIC) connecting both client/network aggregation proxies to RAT 1 and RAT 2 are assumed to use IP addresses denoted as IP_CLT_R1 and IP_CLT_R2 and IP_NTW_R1 and IP_NTW_R2.

Then, for each MPTCP subflow identified by port numbers PN_CLT_X and PN_SRV_X, the multi-path (MPTCP) layer of both network and user-side aggregation proxies creates and uses a socket employing:

TCP-over-UDP headers for symmetric (single-path) routing of payload data over independent RAT 1 and/or RAT 2, TCP headers for asymmetric (multi-path) routing of payload data over RAT 1 and RAT 2, and whereby the network/transport-layer headers of the above protocols share the same port numbers (PN_CLT_X and PN_SRV_X) and IP addresses (IP_SRC_R1/R2 and IP_NTW_R1/R2).

In embodiments, the NCM assists using a trusted (encrypted) control channel in:

the creation/handover of binding rules in NAT boxes that ensure seamless NAT traversal as well as long-lived (TCP-like) status for UDP-encapsulated data in NAT boxes. To this end, parameters such as supported maximum transmission unit (MTU), acceptable sender-side port numbers, binding expiry times, and uplink (UL)/downlink (DL) rate caps can be negotiated/relayed by the NCM by using NAT-facing protocols like Session Traversal Utilities for NAT (STUN) [see IETF RFC 5389], the setting of UL/DL data caps maintained by the proxy senders/middle-boxes as well as matching DL:UL ratio in time-division duplex systems, the activation of multi-path split on Internet Protocol (IP)/Packet Data Convergence Protocol (PDCP) layers. Extending the NCM control over the transport layer also to the control of multi-path splitting of lower layer allows orchestrating the interaction among multiple multi-path-capable layers (e.g., MPTCP over Lightweight IP (LWIP)/LTE/Wi-Fi aggregation (LWA)) in order to ensure proper coexistence of several multi-path decision-makers. For example, excessive delay jitter caused by multi-path IP layer employing coarse capacity estimation with no knowledge of the transport layer decisions can affect the higher-layer congestion control, and vice versa.

In embodiments, the TCP socket can serve as a fall-back socket for the ToU socket, e.g. when non-compliant middle-boxes out of NCM control throttle ToU connections beyond values negotiated by the NCM with compliant middle-boxes.

Example 2

This example is based on the usage of a proprietary transport-layer solution.

Here, an additional UDP socket is used to deliver (i) control signals as well as (ii) auxiliary data to the VPN.

As for the control signals, the information on explicit congestion notification (ECN) for uplink transmissions, contained within the headers of the outer (encapsulating) transport layer and hence accessible only to the kernel of the mobile device operating system, can be delivered over a parallel UDP-based control channel to the client-side user-space VPN that actually controls the inner transport layer, that is also the congestion and rate control process. As for downlink transmissions, the network-side aggregation proxy can be designed to expose the ECN feedback to the user-space if necessary as this entity is assumed to be under the control of network operator/manufacturer.

As for the auxiliary data, the UDP socket can be also used to deliver meta-information related to the data-plane payload such as forward-error correction data (FEC). This input can be used for instantaneous recovery of excessively delayed/lost packets without re-transmission delays. FEC data can be generated as weighted random linear combinations of multiple payload data packets [x]. The multiplicative weights for packet combining are selected at random in an identical, independent, uniform manner. The decoding of a missing payload packet can be then done in real time by using Gaussian elimination.

In terms of usage, an example scheme provides, for every N payload packets, one FEC packet generated from said N payload packets and sent over the secondary protection link. It will be appreciated that the overhead defines the strength of the encoding protection—payload data duplication over the protection link occurs for N=1.

In embodiments, the NCM then controls the FEC overhead by setting a maximum number of link-layer Radio Access Technology (RAT) re-transmissions and maximum re-ordering depth for (payload) data at wireless base stations. In addition, FEC packets are marked as low priority traffic (e.g., by setting the appropriate IP Differentiated Services Code Point (DSCP) flags in IP headers) so that in case of congestion, payload data is treated with the higher priority compared to FEC.

Embodiments enable mobile users with unmodified devices to aggregate the bandwidth of multiple arbitrary radio access technologies (such as macro-cell LTE and public WiFi) and benefit from major WiFi capacity boosts (up to 400%) by using asymmetric routing.

By aggregating three radio access technologies (WiFi in two different bands & LTE), tests have demonstrated average data rates 400 Mbps in unmodified phones as well as seamless traffic steering between uplink and downlink of all paths.

Embodiments provide a robust, easy-to-deploy, and backward-compatible solution that is deployable in the general Internet comprising middle boxes.

For example, embodiments allow mobile users to download wireless data over any public/residential WiFi (e.g., WiFi at home or in a coffee shop) and offload the uplink acknowledgement data over the nearest LTE macro cell (to boost WiFi capacity by avoiding uplink/downlink contention within its medium access layer).

Embodiments exploit the presence of multiple independent transceiver chains in mobile devices and provide a technique for multi-path data delivery over parallel wireless links (paths). In embodiments, the overall bandwidth (latency) of the multi-path approach is better than the sum of per-path bandwidths (minimum of per-path latencies).

As shown subsequently, our proof-of-concept demonstration achieves on average over 400 Mbps of multi-path throughput in standard unmodified tablets.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods.

The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A network node for a wireless telecommunications network, comprising:
   at least one processor;
   at least one memory including computer program code;
   a first radio interlace to another node;
   a second radio interface to said another node;
   the at least one memory and the computer program code configured to, with the at least one processor, cause the network node at least to perform:
   establishing a data session for transmission of data packets between said network node and said another network node;
   the first radio interface being configured for transmission of data packets with said another network node using a first radio access technology in accordance with any of a plurality of different data transport protocols, the first radio interface comprising a 3GPP wireless communications standard interface;
   the second radio interface being configured for transmission of data packets with said another network node using a second radio access technology in accordance with any of a plurality of different data transport protocols, the second radio interlace comprising an IEEE wireless communications standard interface; and
   selecting the 3GPP wireless communication standard interlace as a default radio interlace and TCP as a default data transport protocol for uplink and downlink for transmission of said data packets of said data session between said network node and said another network node;
   changing radio interface and data transport protocol to the IEEE wireless communication standard interface and UDP-encapsulated TCP for downlink in response to network conditions.

2. The network node of claim 1, wherein the at least one memory and the computer program code are configured to, with the at least one processor, cause the network node at least to perform establishing sockets for each radio interface and data transport protocol for transmission between said network node and said another network node.

3. The network node of claim 1, wherein said data packets comprise uplink data packets and downlink data packets and the at least one memory and the computer program code are configured to, with the at least one processor, cause the network node at least to perform selecting which radio interface and data transport protocol to use for transmission of said uplink data packets and said downlink data packets.

4. The network node of claim 3, wherein the at least one memory and the computer program code are configured to, with the at least one processor, cause the network node at least to perform selecting one of said first radio interface and said second radio interface for transmission of said uplink data packets and another of said first radio interface and said second radio interface for transmission of said downlink data packets.

5. The network node of claim 3, wherein the at least one memory and the computer program code are configured to, with the at least one processor, cause the network node at least to perform selecting one of said plurality of different data transport protocols for transmission of said uplink data packets and another of plurality of different data transport protocols for transmission of said downlink data packets.

6. The network node of claim 1, wherein the at least one memory and the computer program code are configured to, with the at least one processor, cause the network node at least to perform selecting which radio interface and data transport protocol to use for subsequent transmission of said data packets.

7. The network node of claim 1, wherein the at least one memory and the computer program code are configured to, with the at least one processor, cause the network node at least to perform selecting which radio interface and data transport protocol to use for each data packet.

8. The network node of claim 1, wherein said data packets of said data session each share a port indicator.

9. The network node of claim 1, wherein each data session is associated with a different port indicator.

10. The network node of claim 1, wherein the at least one memory and the computer program code are configured to, with the at least one processor, cause the network node at least to perform selecting a default radio interface and data transport protocol to use.

11. The network node of claim 1, wherein the at least one memory and the computer program code are configured to, with the at least one processor, cause the network node at least to perform changing which radio interface and data transport protocol to use based on at least one of: conditions affecting data packet transmissions between said network node and said another network node; and one of modified and undelivered data packet transmissions between said network node and said another network node.

12. The network node of claim 1, wherein the at least one memory and the computer program code are configured to, with the at least one processor, cause the network node at least to perform selecting which radio interface and data transport protocol to use for transmission of control information associated with said data session between said network node and said another network node.

13. A network node method comprising:
executing an application which establishes a data session for transmission of data packets between said network node and another network node, wherein said network node has a first radio interface operable to support transmission of data packets with another network node using a first radio access technology in accordance with any of a plurality of different data transport protocols, the first radio interface comprising a 3GPP wireless communications standard interface, and a second radio interface operable to support transmission of data packets with said another network node using a second radio access technology in accordance with any of a plurality of different data transport protocols, the second radio interface comprising an IEEE wireless communications standard interface; and
selecting which radio interface and data transport protocol to use for transmission of said data packets of said data session between said network node and said another network node by selecting the 3GPP wireless communication standard interface as a default radio interface and TCP as a default data transport protocol for uplink and downlink and changing radio interface and data transport protocol to the IEEE wireless communication standard interface and UDP-encapsulated TCP for downlink in response to network conditions.

14. A non-transitory computer readable medium comprising program instructions for causing an apparatus to perform at least the method of claim 13.

* * * * *